Patented Mar. 29, 1938

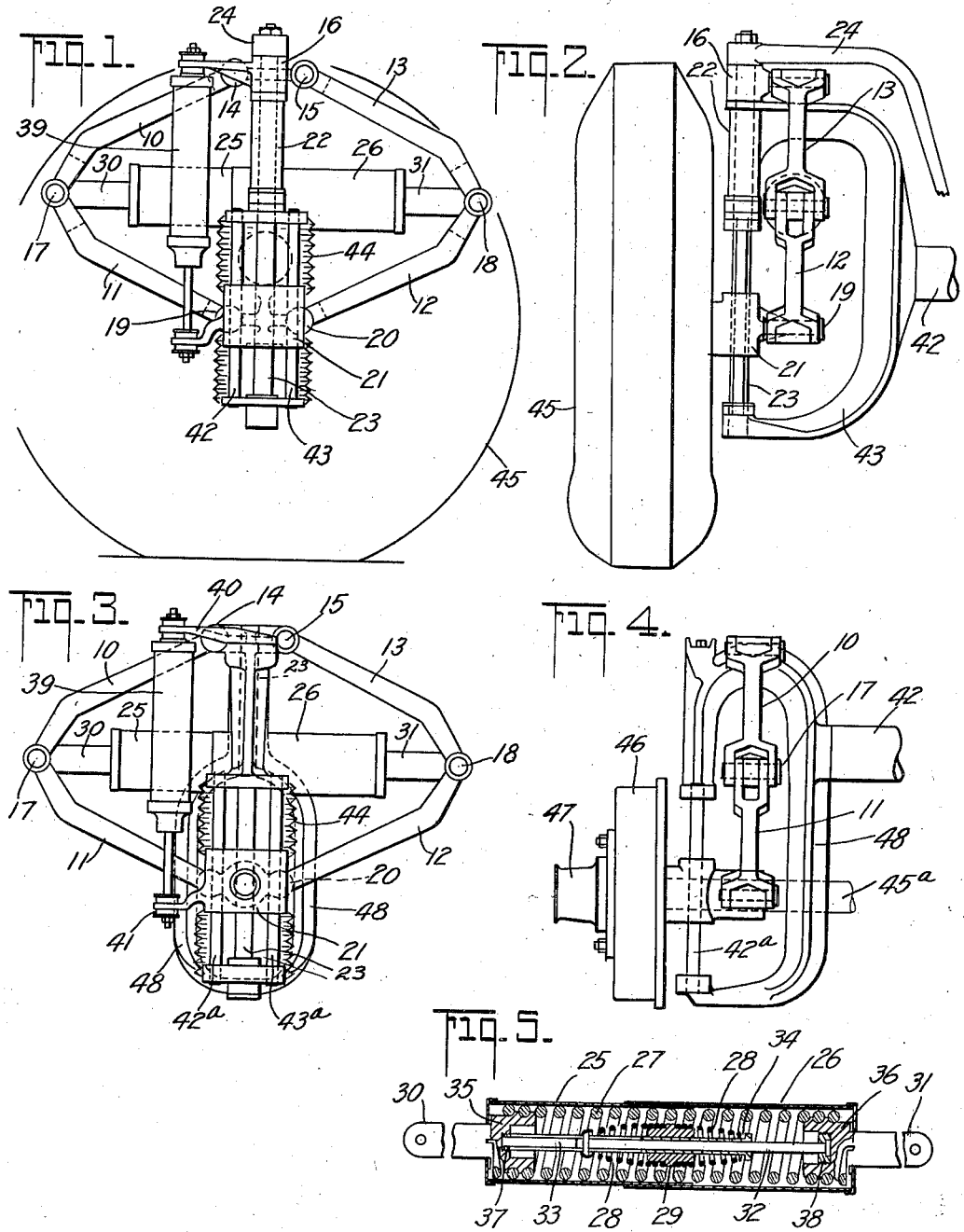

2,112,293

UNITED STATES PATENT OFFICE 2,112,293

INDIVIDUAL WHEEL SPRING SUSPENSION

Valentine O. Kromm, Brooklyn, Harry L. Kohl, Valley Stream, and Charles H. Courtney de Guere, Brooklyn, N. Y.

Application July 10, 1934, Serial No. 734,448

7 Claims. (Cl. 267—20)

This invention relates to an improved form of spring suspension for automobile bodies, and more especially to an individual wheel suspension system and is an improvement over applicants' pending application Serial Number 702,716 filed December 16, 1933 for Individual wheel suspension means.

An object of the invention is to provide an individual wheel suspension system that can be easily attached to any motor vehicle chassis with few minor changes, or built as a complete chassis.

Another object is to provide a wheel suspension wherein each wheel rides and is suspended in its own complete unit rigidly, and has full freedom of perpendicular movement without affecting the steering mechanism or flexible drive shaft, and which additionally provides full floating individual wheel movement and gives proper rigidity and provides ample safety factors.

Another object is to provide such a device with an outer and inner spring means so arranged that the outside large spring operates on the wheel inertia and extends in accordance with the position of the flexible diamond, and the inside small spring comes into action after the large spring is well under way and serves to control the speed of the wheel movement counter-balancing the outside spring action by being compressed in relation to the extending positions of the large spring.

All these and other objects, as suggested here below, are attained by the method and means now to be described, and illustrated in the accompanying drawing, in which—

Figure 1 is a side elevational view of one of the individual wheel suspension devices adapted for one of the two front wheels of the vehicle.

Fig. 2 is an end elevational view, vertical in character, the same as Fig. 1 but taken at an angle of 90 degrees thereto.

Fig. 3 is a view similar to that of Fig. 1 but showing instead the individual wheel suspension device adapted for use on the rear wheels of the vehicle.

Fig. 4 is a side vertical elevational view of the device of Fig. 3.

And Fig. 5 is a longitudinal diametral cross-sectional view of the inner and outer spring assembly which controls the action of this device.

Like numerals refer to like parts throughout the several views.

Applicants' device shows a flexible diamond construction comprising four members, 10, 11, 12, and 13, the upper end of members 10 and 13 being rotatable on pins 14, 15, respectively, rigidly secured to the chassis member 16 and pivoted around ends 17, 18, to the lower members 11, 12. Members 11, 12 are rotatably fastened or mounted on bearing pins 19, 20, which are solidly attached to the wheel axle or stub 21. Perpendicularly aligned guide holes, shown by the dotted line 22, house the king-pin or guide 23 which goes straight through the center in a perpendicular direction; the steering radius arm and fulcrum 24 is connected to the suspension unit at the top.

The pivoted ends of the diamond construction 17, 18 are connected together by means of a spring assembly shown in Fig. 5 in detail. This assembly consists of two oppositely disposed horizontal casings fitting one within the other, these being numbered 25, 26, said casings surrounding a large outside spiral spring 27 and small inside springs 28 each tapered to a smaller diameter at its outer end and abutting one another at their inner ends, by being mounted on and secured to a connecting member 29, the spring assembly by its connecting member 30, 31 at each end being attached to pins 17, 18 of the diamond construction.

Inner spring 28 is attached by means of a telescoping rod portion 32 to the opposite end of the large spring 27, and the oppositely positioned spring 28 is connected by the other portion 33 of the telescoping rod to the opposite end of large or outer spring 27. By this construction the outer spring extends under tension for a small distance during the beginning of the operation, this distance being shown at 34, after which extension the two inner springs 28, 28 each being attached by its telescopic rod section to the opposite end of the outer spring, begin to compress to snub down the action of the outer spring from that point on.

This construction, then, comprises a means of applying a reduced action at the initial period of movement, this action being furnished by the initial tensioned movement of the outer spring. Such action takes care of the initial need for a spring resistance for all the smaller movements of the wheels going over the road and requiring spring action. However, when going at higher speeds or over rougher roads where increased spring tension is necessary the smaller tapered inner springs come into play following the initial action of the outer spring and thereafter combine with such outer spring to provide increased resistance and so take up the increased load under those later conditions.

All three springs in this construction are therefore seen to be in a parallel line and operating about a common axis and conveniently positioned within a cylindrical casing.

The outer spring 27 is made adjustable as to tension by having its ends screw over a threaded surface on the end members 35, 36, which are also enclosed within the telescoping casing 25, 26.

The two inner coil springs are also adjustable by having the telescoping rod portions 32, 33 to which they are attached adjustable at their outer ends by being held in threaded engagement at 37, 38 to members rigidly secured to the end members 30, 31. The inner springs 28, 28 are also somewhat conical in shape, being tapered toward their outer ends to a lesser diameter as shown. The inner springs are tapered to a smaller diameter toward their ends to provide a varying tension takeup or compression takeup under load or impact.

It should also be noted that because of the peculiar construction of this composite spring which takes up its load or impact in varying degrees throughout its movement, that any given size of spring assembly as regards its ability to take up tension and compression forces is adapted for use on cars over a wide range of weights and also both on the front and rear wheels. This makes for standardization of parts in car construction and simplifies and eliminates the number of different parts which are required.

A shock absorber of any standard make either pneumatic, hydraulic, or mechanical and designated by the numeral 39, is mounted in a vertical position on this spring assembly its upper end being attached by a flanged arm 40 to the upper portion of the diamond assembly and its lower end being attached at 41 to a flanged yoke surrounding the lower diamond assembly portion.

A frame member part of the chassis is shown at 42, this terminating in a bracket member 43 designed to support the wheel assembly comprising this invention. The king-pin 23 is held in vertical position. Member 16 turns with king pin 23 and independently of chassis bracket 43.

The vertically sliding stub axle 21 is mounted to slide on spaced rods 42ª, 43ª, positioned on either side of king-pin 23. This construction provides a positive vertical guide for the sliding member 21 while at the same time combining with bracket 43 to provide a very rigid anchorage for the whole wheel assembly. It also prevents side sway or back and forward movement of the wheel.

A gaiter member 44 is positioned around the guide rod assembly to keep out dust and retain lubricant. This may be made of any suitable material adapted to fit over the parts readily.

The center of the wheel 45 is positioned a little to the rear of the center line of the wheel assembly support which is the center line of the king-pin 23, to provide a caster effect on the wheel assembly. In addition the wheels are cambered slightly or slanted from top to bottom inwardly as shown particularly in Fig. 2 to increase ease of steering. This camber effect is, and note this, also applied to the construction of the rear wheels now to be described.

The construction of the device for use on the rear wheels is shown in Figs. 3 and 4 and it will be seen is very similar to the construction in the front wheel with the omission of, however, the king-pin 23, steering arm 24 and attendant construction required for front wheel steering. The rear wheel assembly, however, is mounted somewhat differently than the front wheel assembly due to the rear wheel drive construction.

There is shown in Fig. 4 a drive shaft 45ª a wheel brake drum 46 and wheel hub 47, said drive shaft 45ª being positioned between the two divided portions of brackets 48, 48, as shown in Fig. 3. Otherwise the construction is the same as regards the sliding member 21, space rod 42ª, 43ª, the diamond assembly and shock absorber 39, but omitting of course the king-pin construction 23 of Fig. 1 which is needed only for the steering wheel. However in case of front wheel drive the construction would include the king-pin 23 affixed to the side rod assembly 42ª, 43ª, and the whole turning around the lower end of the king-pin, as shown in Fig. 3. Drive shaft 45ª is of the Cardan type. It will thus be seen that applicants have provided a construction wherein the several springs coordinate in their action on the flexible diamond in its spring control of the wheel and that all springs operate in the same plane. Moreover, each spring may be adjusted as desired to varying tensions and compressions in order to obtain the best results for a given weight of chassis and other varying factors to produce the best riding conditions for any given condition of road, type of car or load on the car.

With this type of adjustable spring suspension there may be used a new type of shock absorber, pneumatically operated, with adjustable stability control by which the shock absorber can be synchronized with the relative actions of the extension and compression coil springs. Moreover the shock absorber is positioned in a line parallel to the action of the wheel, compensating the movements of the horizontal suspension coil springs. By means of the adjustment both on the shock absorber and the coil springs improved riding qualities are possible through coordination in said adjustment.

It will also be seen that from a steering standpoint the wheel knuckles slide vertically on the two rods rigidly positioned around the special king-pin, one rod on each side, these being for the purpose of turning the wheel and its entire suspension assembly, also for guiding the wheels in this vertical action. The special king-pin is held in place both at the top and bottom of the suspension mechanism by the chassis bracket, thus eliminating all strain on the steering mechanism. The wheels and suspension system are left free to perform the duties of springing without transmitting the vibration to the steering assembly. The construction provides further advantages such as permitting the built in feature of wheel caster and camber without the necessity of later adjustment.

It will also be noted that the rear drive wheel minus the king-pin and steering mechanism is of similar construction including two vertical wheel guide rods to accommodate the drive shaft movement in relation to the wheel action, the chassis bracket being provided with a slot to permit vertical movement of said drive shaft. The differential is fastened rigidly to the chassis, a feature not found on present day cars.

In order to obtain full wheel action the two short drive shafts, one on each side of the differential, must be as previously stated of the well known Cardan type, that is a sliding shaft (telescoping) with wide angle universal joints at both ends. This takes care of any position in relation to wheel movement.

Having now described the invention, what is claimed as new and for which Letters Patent of the United States is desired, is:

1. An individual wheel suspension including a toggle-joint link construction between chassis and wheel, the said toggle construction including upper links pivotally fastened to the chassis at closely adjacent points and lower links having their adjacent link ends retained in vertically slidable position immediately therebelow and attached to the wheel axle there being retaining means for so retaining said last-named link ends, including horizontal spring resistance means positioned wholly above the axle and connecting opposite centrally-disposed outwardly-projecting ends of the link construction to retard their collapsing outwardly, said spring means including a plurality of concentrically-arranged independently acting springs adapted to operate in succession under different impact conditions between chassis and wheel.

2. The invention as in claim 1, the horizontal spring means being positioned in a single casing and comprising a large outer spring and two smaller inner springs abutting each other at their inner ends and so connected to the outer spring that during an initial movement of said outer spring the inner springs have no connection but thereafter they cooperate with said outer spring to increase the tension required to move said spring assembly.

3. A combined tension and compression spring assembly comprising a casing, an outer tension spring positioned within the casing, and a pair of aligned and abutting inner compression springs positioned within the outer spring and connected to said outer spring to operate therewith only after an initial movement of said outer spring.

4. The invention as in claim 3, including a toggle-joint linkage connected at two opposite horizontal pivot-points to the ends of said spring assembly, the upper pivot portion of the linkage being adapted to be fastened pivotally to a vehicle chassis and the lower pivot portion to a wheel.

5. In combination in an individual wheel suspension, of a casing enclosing only an outer spring and an inner spring assembly in concentric relation therewith, the outer spring extending beyond both ends of the inner spring and being adapted to be operated by the wheel inertia during impact, and the inner spring assembly being adapted to come into action after the start of action of the outer spring, and in an opposite direction thereto, and to completely control the speed of the wheel movement in a solely vertical direction.

6. The invention as in claim 5, the outer spring being in tension under load and the inner spring assembly being in compression under load.

7. The invention as in claim 5, each of said springs being independently adjustable.

VALENTINE O. KROMM.
HARRY L. KOHL.
C. H. COURTNEY DE GUERE.